United States Patent Office 2,844,254
Patented July 22, 1958

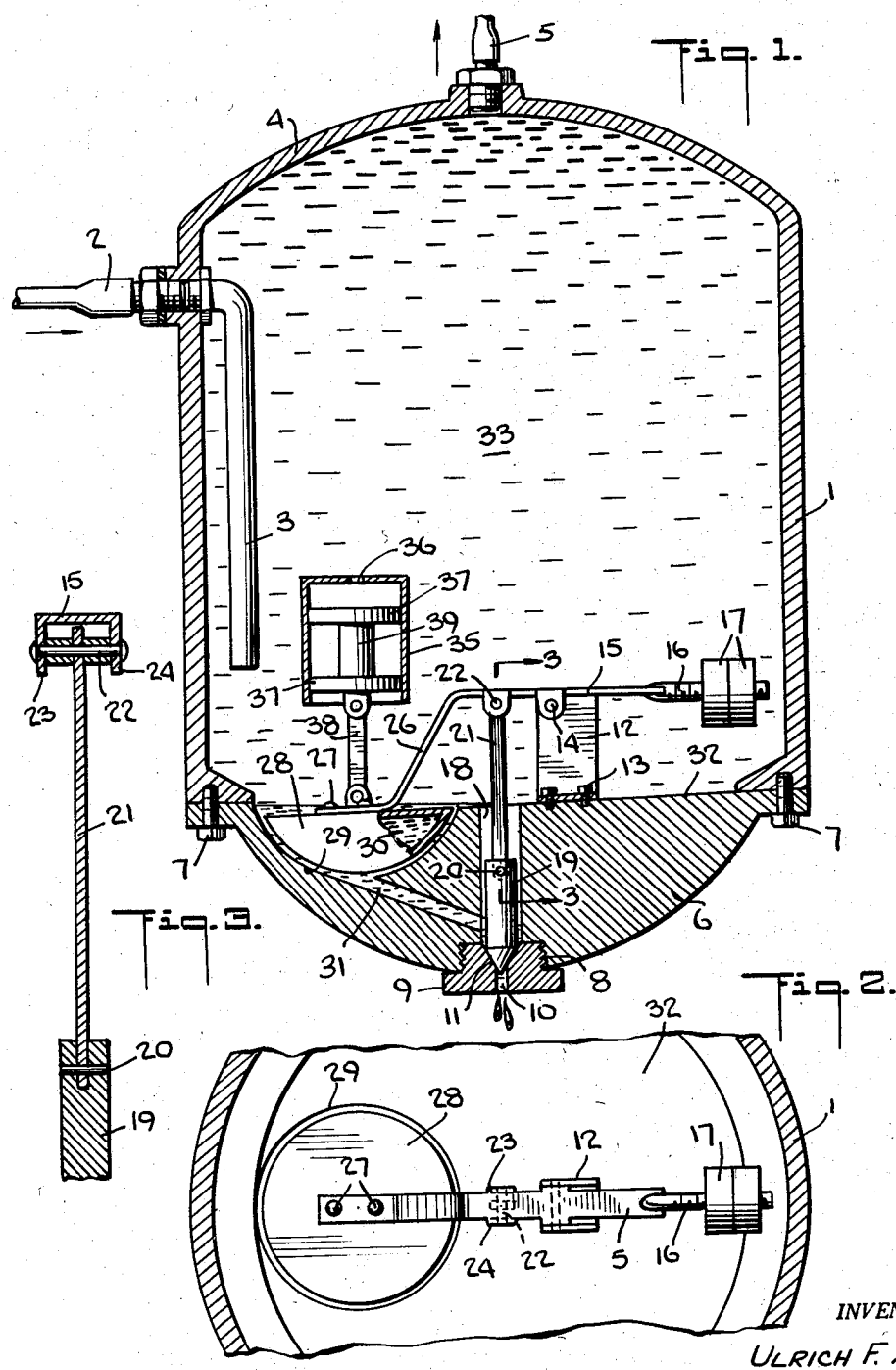

2,844,254

APPARATUS FOR REMOVING WATER FROM ORGANIC LIQUIDS AND FUELS

Ulric F. Ansley, Brooklyn, N. Y.

Application June 16, 1955, Serial No. 515,869

2 Claims. (Cl. 210—114)

The present invention is directed to an apparatus for removing water from organic liquids immiscible therewith, and more particularly to separation of water from liquid fuels such as gasoline, diesel oil and the like.

In the prior art, various devices for accomplishing such a purpose have been known. However, such devices had various defects, as for example, it has been proposed to provide an auxiliary tank through which the fuel was intended to flow and having a valve in the bottom thereof held in position by a weight. A pivot arm having a float at the free end thereof was so attached to the valve that when a relatively large quantity of water had accumulated, the float would overcome the force exerted by the weight and allow some of the water to be drained off. This was quite unsatisfactory as the mounting interfered with the free movement of the valve and a considerable amount of water was always present in the tank. In another device for the same purpose, there was provided a float to which the valve in the bottom of the tank was attached and a seal was provided of mercury which acted as the valve. In this case also a considerable body of water was maintained in the tank, and the seal was subject to displacement due to motion of a vehicle so that the valve would at times open when it should have been closed.

The present invention is intended and adapted to overcome the difficulties and disadvantages inherent in prior devices of the type described, it being among the objects of the present invention to provide a construction which is simple, efficient in operation, and in which only a very small quantity of water is present in the tank.

It is also among the objects of the present invention to provide a unitary assembly of the operating mechanism whereby to provide for ready removal of the unit for inspection, repair or replacement.

It is further among the objects of the present invention to provide a device of the character described which is highly sensitive and which will allow the separation of very small quantities of water from the organic liquids.

In practicing the present invention, there is provided an auxiliary container having a removable bottom. The bottom contacts all of the mechanism, which includes a needle valve with a seat which is both adjustable and removable. There is further provided a lever pivoted on said bottom, having a float at one end and adjustable counterweight at the other end, the purpose being to exactly balance the weight of the float.

An important feature of the invention is the fact that the float is completely filled with an oil, which is heavier than the organic liquid and lighter than water. This insures positive operation of the needle valve so that immediately upon water being drained through the valve, it will close sharply. The bottom is preferably made sloping and a recess is formed at the lower end of the slope into which the float fits. Thereby only a small quantity of water can be present in the apparatus at any time. If access to the mechanism is desired, the bottom of the tank may be removed whereby all of the parts are exposed to view and they may be cleaned, repaired or replaced.

In the accompanying drawing constituting a part hereof and in which like reference characters indicate like parts, Fig. 1 is a vertical, cross-sectional view taken through the apparatus of the present invention, some parts being shown in elevation;

Fig. 2 is a fragmentary top plan view of the bottom of the tank and the mechanism mounted thereon, some parts being shown in section; and Fig. 3 is a vertical cross-sectional view somewhat enlarged taken along line 3—3 of Fig. 1.

Container or tank 1 may be of any suitable shape, but here shown as cylindrical. At one side thereof an inlet pipe 2 enters the tank and has a downwardly extending tube 3 terminating somewhat above the bottom of the tank. The top 4 thereof is dome-shaped and has an outlet 5 for the purified liquid. Bottom 6 is held onto the sides of tank 1 by a series of bolts 7 or any well-known equivalent means.

At the lower end of bottom 6 there is a threaded portion into which is threaded a plug 9 having a central opening 10 and a conical seat 11 in the upper portion thereof.

Bracket 12 is held by screws 13 onto the bottom 6 and there is pivoted at 14 a lever 15. The right hand end of said lever is provided with a threaded portion 16 and a pair of nuts 17 is held thereon.

In a central opening 18 in bottom 6, needle valve 19 is placed, having linked thereto at pivot 20, a link 21 which in turn is pivoted at 22 to the left hand side of lever 15 and adjacent to bracket 12. Pin 22 is held between downwardly extending portions 23 and 24 of lever 15.

Extension 26 from lever 15 is riveted at 27 to float 28 which is placed within recess 29 in bottom 6. The shape of float 28 is such that it conforms with the shape of recess 29, being in this case arcuate in cross-section. Float 28 fits into recess 29 so as to leave a narrow space between said elements when needle valve 19 is in contact with seat 11.

Oil 30 of a density less than water and greater than the liquid in the tank fills the float. Thereby there is the tendency for said float to sink through the organic liquid and to remain within the recess. Thereby only a small quantity of water can accumulate at any time within said recess before the float rises and releases the water.

A connection 31 allows communication between recess 29 and opening 18, said connection extending downwardly from the recess so as to tend to drain water therefrom. The upper surface 32 of bottom 6 slopes downwardly toward recess 29 so that any water which may be deposited will run down into said recess.

In the operation of the device, liquid fuel 33 enters through pipe 2 and fills tank 1, emerging through exit 5. Float 28 is in its lowest position with needle valve 19 closed. In time water accumulates in recess 29 and when said recess is practically filled with water, float 28 will rise a very small amount, lifting valve 19 from seat 11 and allowing a few drops of water to flow out through opening 10. As soon as the water in recess 29 has become more or less depleted, the weight of oil 30 in the float will cause it to sink in a positive manner, overcoming the effect of counterweight 17 and firmly closing valve 19. There is no possibility of the loss of any of the fuel as there is always a small amount of water in passage 31 and recess 29.

In some cases, in order to prevent wobbling of float 28 when the vehicle is traversing a rough road, there is provided a cylinder 35 mounted by a bracket (not shown) on bottom 6. The lower end of said cylinder is usually open and a small opening 36 is formed in the top thereof. A piston 37 in said cylinder is connected to float 28 by link 38. The piston is in two parts connected by bar 39 to provide stability.

I claim:

1. In an apparatus for removing water from immiscible liquids comprising a closed container, an inlet and an outlet in said container the improvement which comprises, a lever pivoted on the bottom of said container, a float on one side of said pivot and a counterweight on the other side thereof, said counterweight balancing said float, a needle valve in said bottom, a seat for said valve, a link between said valve and said lever, a passage from said container to said valve, a drain from said valve leading out of said container, said float being filled with oil, a depression in said bottom, said float being at least partially within said depression, said passage being within said bottom and leading from said depression to said valve.

2. In an apparatus for removing water from immiscible liquids comprising a closed container, an inlet and an outlet in said container the improvement which comprises, a lever pivoted on the bottom of said container, a float on one side of said pivot and a counterweight on the other side thereof, said counterweight balancing said float, a needle valve in said bottom, a seat for said valve, a link between said valve and said lever, a passage from said container to said valve, a drain from said valve leading out of said container, said float being filled with oil, a depression in said bottom, said float being at least partially within said depression, said passage being within said bottom and leading from said depression downwardly to said valve.

References Cited in the file of this patent

UNITED STATES PATENTS

| | | |
|---|---|---|
| 535,611 | Bougher | Mar. 12, 1895 |
| 729,679 | Schwaninger | June 2, 1903 |
| 895,083 | Gardiner | Aug. 4, 1908 |
| 1,451,148 | Floring | Apr. 10, 1923 |
| 1,529,702 | Howell | Mar. 17, 1925 |
| 1,831,318 | O'Neil et al. | Nov. 10, 1931 |
| 2,037,245 | Leifheit et al. | Apr. 14, 1936 |
| 2,243,002 | Cronk | May 20, 1941 |
| 2,366,404 | Hintze et al. | Jan. 2, 1945 |